Nov. 10, 1953 A. R. ERICKSON ET AL 2,659,068
SYSTEM RESPONSIVE TO LIQUID LEVEL
Filed Nov. 8, 1949 2 Sheets-Sheet 1
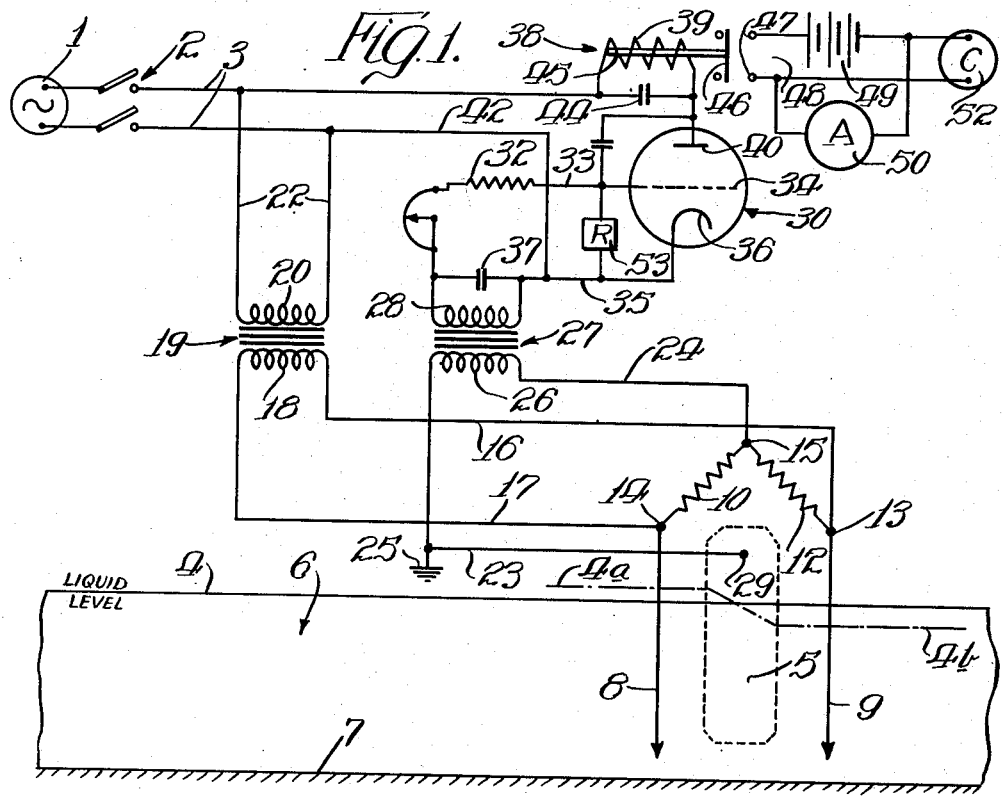
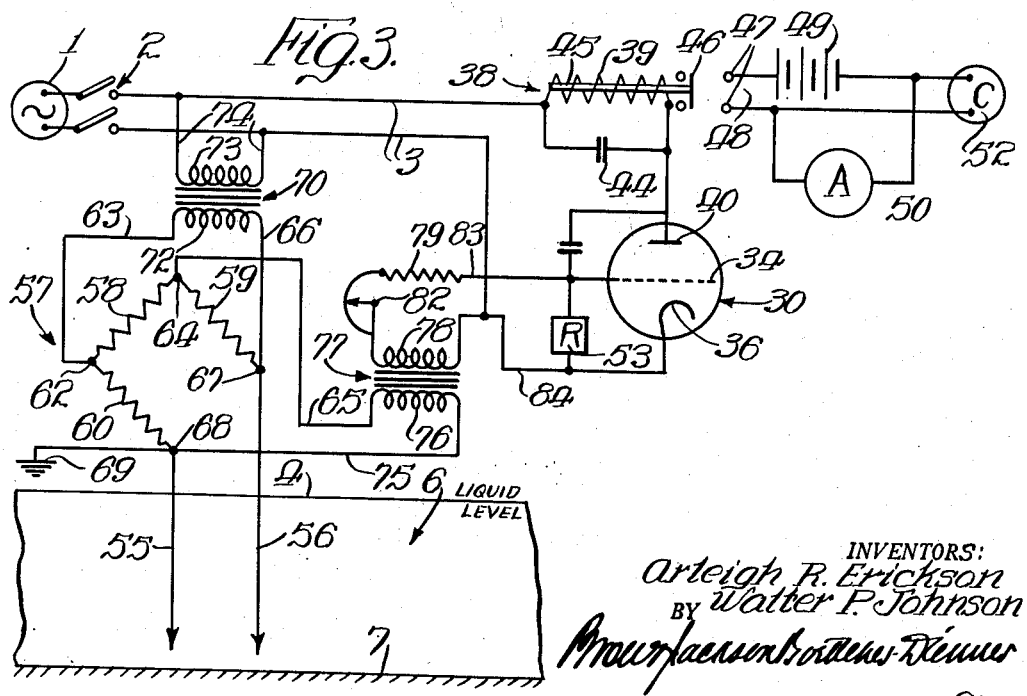
INVENTORS:
Arleigh R. Erickson
Walter P. Johnson

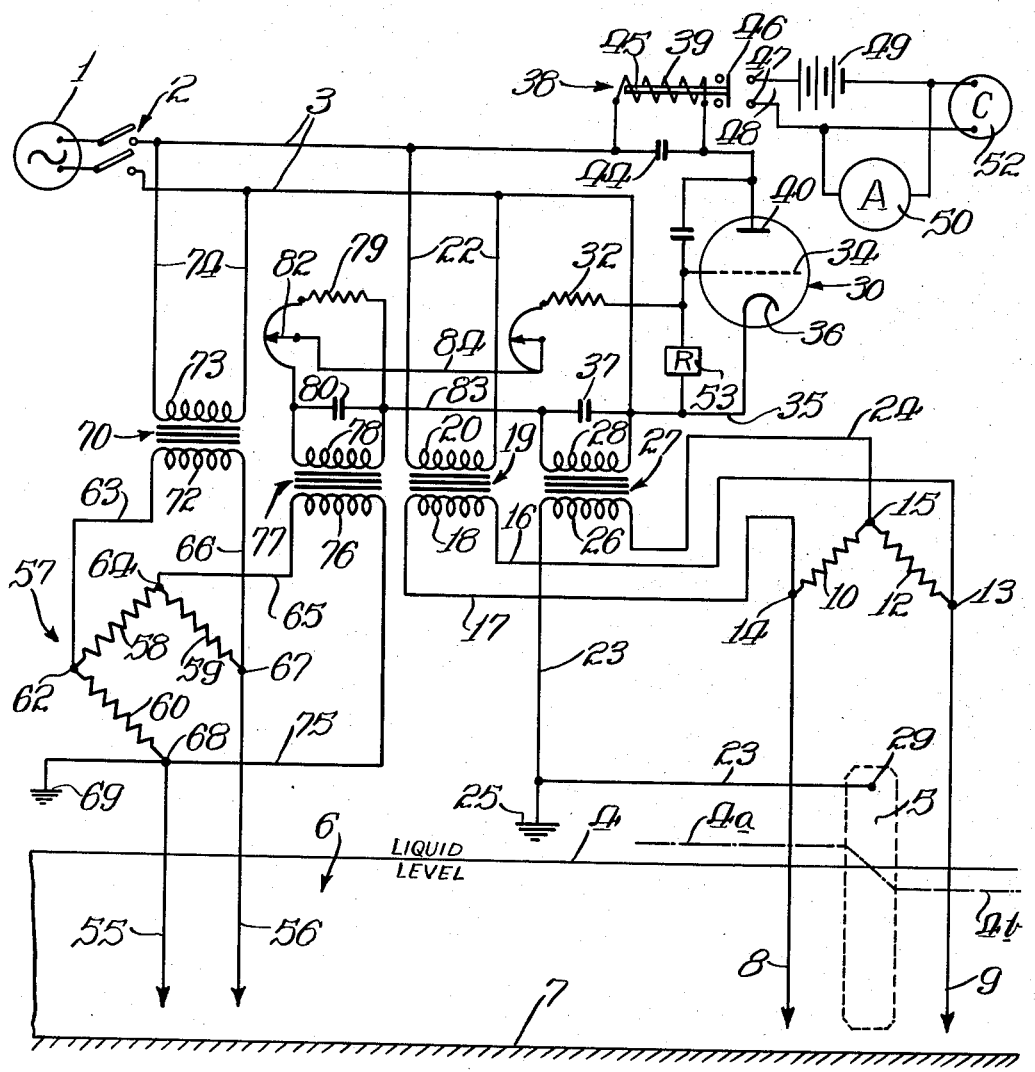

Patented Nov. 10, 1953

2,659,068

UNITED STATES PATENT OFFICE 2,659,068

SYSTEM RESPONSIVE TO LIQUID LEVEL

Arleigh R. Erickson and Walter P. Johnson, Aurora, Ill.

Application November 8, 1949, Serial No. 126,208

3 Claims. (Cl. 340—244)

Our invention relates to a system wherein an electric circuit responds in predetermined manner to variations in behavior of a stream or body of water.

The preferred embodiment of the invention is applied to a stream of water employed, for example, as condensing water for a power plant. The invention is not limited to a specific purpose or application, but is applicable to various situations as will be apparent from the following detailed specification, the true scope of the invention being ascertainable by reference to the appended claims.

In supplying cooling water to the condensers of a power plant, it is generally necessary to screen out of the incoming stream solids such as sticks, leaves, refuse of all kinds, etc., to keep them out of the narrow passages of the condenser. A continuously rotating screen is commonly employed for this purpose. There are occasions when, due to storms, floods, ice conditions, or the like, when the screen may become clogged to the extent of diminishing the flow of cooling water. This can also occur in the event of failure of the screen driving mechanism or its power supply. As the continued operation of the plant depends upon continuity of supply of cooling water, any substantial diminution of flow should have immediate attention.

In case clogging of the screen obstructs the flow in any substantial degree, there is at once created a difference in level between the intake side and the discharge side of the screen. The system of our invention will promptly detect and give warning of this condition of difference in level on opposite sides of the screen. Obviously, control means to alternate the situation may at the same time be set into action by this indication.

The condition of the screen is usually the critical question, but if the level of liquid in the stream should fall without reference to any difference created by the screen, this condition should also promptly be notified to the service attendants. The system of our invention may be utilized to detect and give warning of the same.

Our invention may be employed to indicate, measure, and record such relative differences in level, and also variations in absolute level. It may be utilized to maintain level or differences in level by placing level restoring means, such as pumps or valves under the control of the system.

The system is capable of responding to or compensating for variations in electrical conductivity of liquids involved.

Level responsive systems are known, but our investigation of available equipment revealed no means suitable for the purpose to which the preferred embodiment of our invention is applicable. For supervising the inflow of cooling water and the like, a wide range of response and control is essential. The system must operate in freezing temperature and under turbulent conditions of the liquid and under variations of liquid conductivity. The system of our invention meets the above requirements.

In the development of our invention, we conceived the possibility of employing variations of resistance of the liquid controlled by variations in liquid level to avoid the necessity of moving parts. We are confronted at once with several difficulties, which have heretofore not been adequately met.

For economical and reliable operation of such a system it is highly desirable to use commercial alternating current, but variations in voltage would tend to upset any measurement based on resistance variations in control. This introduced a difficult problem. This we solved by the concept of using a triode as a relay means.

Next, we found that variations in absolute level and conductivity of the liquid stream would tend to upset response. This we solved by the adoption of the Wheatstone bridge and an auxiliary compensating circuit. Also, we found it undesirable, for several reasons, to connect the commercial power circuit directly to grounded equipment. There is too great a tendency to short circuit, and the usual commercial voltage of 110 to 120 volts is sometimes dangerous to personnel. We solved this difficulty by isolating the grounded equipment through the use of transformers. At the same time, the voltage on the grounded circuit could be reduced through the selection of suitable winding ratios in the transformers.

The invention may be applied to a variety of purposes, wherein the variable, to which response is to be made by way of indication, measurement, recording or correction, or any combination of the same, is difference in levels or variations in level; and the distinctive means is a Wheatstone bridge or modified Wheatstone bridge circuit, isolated from but energized by the alternating current power supply circuit.

Now in order to acquaint those skilled in the art with the manner of constructing and operating a device in accordance with our invention, we shall describe, in connection with the accompanying drawings, the preferred embodiment of the same.

In the drawings:

Figure 1 is a diagram of a system responsive to differences in level of liquid upon the opposite sides of a screen;

Figure 2 is a diagram of the same system with means for applying a correction thereto; and Figure 3 is a diagram of a circuit responsive to level of liquid in a stream or in a static liquid.

The same reference characters in the several figures identify the same parts throughout.

Referring first to Figure 1, the source of alternating current supply 1 is connected through a suitable switch 2 to the alternating current power supply mains 3, which may be operated at the usual house voltage of from 110 to 120 volts, 60 cycle A. C., as a convenient source of power for our system. There is no particular limitation in the voltage and frequency, so far as the operation of the system is concerned, but it is of maximum utility to be able to employ the almost universal 110 volt, 60 cycle A. C. current.

A suitable rotating screen 5, the details of which are not important in this connection, is set transversely in the liquid stream 6 which is confined within a suitable channel or tunnel, the walls of which are represented by the bottom wall 7. The screen 5 is constructed of metal and is inherently grounded in the liquid. The function of the screen is to remove continuously debris and impurities which may be intercepted by it to keep the same from clogging the tubes or restricted passages of the condenser to which the stream of water 6 is conducted for the purpose of condensing the steam. Obviously, instead of being used as cooling water, any other purpose may be served by said water in the stream 6 without affecting the present invention. Two rodlike electrodes 8 and 9 extend from a point well above the normal level 4 of the liquid, and two resistances 10 and 12, which, after they are once adjusted, remain fixed, are connected between the electrodes 8 and 9 at the terminals 13 and 14. The two resistances 10 and 12 with electrodes 8 and 9 dipping into the stream of water 6 constitute the essentials of a Wheatstone bridge. Difference of electric potential is supplied to the terminals 13, 14 to energize both sides of the bridge by leads 16 and 17 which are connected to the secondary or low tension winding 18 of a step-down transformer 19, the high tension winding 20 of which is connected by the leads 22 to the power supply mains 3. Difference in electric potential applied to the terminals 13 and 14 of the bridge structure causes current to flow in two parallel paths, namely, the first path through the fixed resistors 10 and 12, and the second path through the electrodes 8 and 9, and the interconnecting body of water of the stream 6. The electrodes 8 and 9 are preferably formed of resistance conductor, so that more or less of the resistance conductor will be included in the circuit as the water level lowers or rises in respect of each one.

The bridge circuit between midpoint 15 and the grounded liquid stream 6 is connected through conductors 23 and 24 to the low tension winding 26 of the step-up transformer 27, the high tension winding 28 of which is connected in series with the grid circuit of the electronic triode tube 30. The grounded lead 23 is purposely grounded at 25, and it connects also to the metallic structure of the screen 5 as indicated by the connection 29, thereby connecting to the water into which electrodes 8 and 9 extend. Transformers 19 and 27 are preferably substantially identical, whereby the entire grounded structure is subjected to a potential difference of only a few volts, for example, 6 to 12 volts is adequate. The secondary 28 of the step-up transformer 27 is connected through adjustable resistance 32, inserted in lead 33 extending to the grid 34 of the triode 30. The opposite terminal of the winding 28 is connected through the lead 35 to the cathode 36 of the triode. A condenser 37 across the leads 32, 35 is provided to correct the power factor of the grid circuit. This is for the purpose of keeping the alternating potential in the grid circuit in phase with the potential applied to the plate circuit. A relay 38 has its winding 39 connected in series with the plate circuit, one terminal of the winding 39 being connected to one of the power supply leads 3, the other terminal being connected to the plate 40 of the triode 30. The cathode 36 of the tube 30 is connected through the wires 35, 42 to the other side of the power supply mains 3. A condenser 44 may be connected across the terminals of the winding 39 to keep the armature from chattering and for power factor correction. Current normally flows through the plate circuit and energizes the winding 39 of the relay 38, retracting the plunger 45 and its contactor 46 from the stationary terminals 47 of an alarm and control circuit 48.

The alarm and control circuit 48 contains a source of potential 49, and an alarm 50 and a control element 52. The operation of the system is as follows:

When the liquid level on both sides of the screen 5 is the same as indicated, for example, at 4, the bridge is in balance. No potential appears across the point 15 and ground, and hence the grid circuit is inactive. Current flows through the relay 39 and through the tube 30 to hold the alarm and control circuit 48 open.

If now the liquid level on opposite sides of the screen 5 should show a difference, as, for example, on the dot and dash line 4a and 4b, the bridge becomes unbalanced and alternating current from the low voltage winding 18 does not maintain the points 15 and ground at equal potentials, so that a potential difference appears upon the windings 26 of the step-up transformer 27. This in turn places a potential upon the grid 34 in phase with the impressed voltage on the plate circuit and reduces the current flow through the relay winding 39. If the difference in level is significant, the potential applied to the grid 34 will be sufficient to reduce the current flow through the winding 39 to the point where the plunger 45 will drop the contactor 46 upon the terminals 47 of the circuit 48, giving an indication on the alarm A, and energizing the control element 52. The operation of the control element 52 may be to open up another channel for liquid flow, or to take any other corrective action. This is not within the confines of the present invention, and is therefore not illustrated.

If and when the liquid level becomes normal, that is, when there is no substantial difference in level upon the two sides of the screen 5, the potential on the grid 34 will drop to a point where the winding 39 of the relay 38 will again be energized and the alarm and control circuit 48 be opened.

If it be desired to record the differences in level upon opposite sides of the screen, the indicating recorder 53 may be connected across the secondary winding 28 of the step-up transformer 27. The variations in potential of the bridge circuit 23, 24 correspond to the differences in level to which electrodes 8 and 9 are subjected. If, however, the absolute level, that is, the flow of water in the stream 6 should be reduced, as by an overall decrease in flow, a correction or compensating factor should be introduced, since the introduction of so much additional resistance in the bridge circuit tends to reduce the current flow through the transformer winding 26, even though the developed potential across the bridge is not substantially altered.

In Figure 2 we have shown a complete system embodying the essentials of Figure 1 and compensating means responsive to variations of level and conductivity of the liquid of the stream 6.

A pair of electrodes 55 and 56 similar to electrodes 8 and 9 project downwardly into the stream 6, and these electrodes with the liquid of the stream 6 constitute the fourth arm of a Wheatstone bridge 57, the other three arms of which 58, 59 and 60 are fixed resistances. These resistances are adjusted to balance the bridge for normal level. The resistance 58 is connected at terminal 62 to the power supply conductor 63, and to the adjacent terminal of the resistance 60. At its other end it is connected at point 64 to the adjacent terminal of the fixed resistance 59 and to conductor 65 of the bridge circuit. Resistance 59 is connected at one end to the point 64 and at its other end to the electrode 56 and power supply conductor 66 at point 67. Resistance 60 is connected between the point 62 where it joins the other arm of the bridge, and point 68 which is connected to the electrode 55 and to the ground 69. The power supply connections 63, 66 to the bridge 57 are connected to the secondary winding 72 of the step-down transformer 70, the primary or high tension winding 73 of which is connected by the leads 74 to the power supply mains 3. The conductors 65 and 75 of the bridge circuit are connected to the secondary winding 76 of the step-up transformer 77, the secondary or high tension winding 78 of which has connected there across the adjustable resistance 79 which is similar to the resistance 32 in the circuit of the transformer 27. A condenser 80 similar to the condenser 37 is connected across the transformer winding 78 to correct the power factor to bring the potential developed in phase with the potential impressed by transformer 27 upon the plate circuit of the triode 30. Conductor 83 is connected to one side of the transformer winding 78 and conductor 84 is connected by means of the adjustable contactor 82 to a suitable point on the adjustable resistance 79 to pick off a desired part of the potential impressed upon the resistor 79. This potential is additive to the potential of the secondary 28 of the transformer 27, and the sum of the two potentials is applied to the grid 34 of the triode 30.

The Wheatstone bridge 57 and its connections are so related to the main Wheatstone bridge, including the electrodes 8 and 9, that for any change in absolute level, or in conductivity of the liquid under consideration, suitable compensation will be made. Hence, no alarm or corrective action will be given, unless there arises a predetermined difference in liquid level on the opposite sides of the screen 5 corresponding to a condition of clogging of the screen. Such predetermined difference in level will cause a response independently of variations of rise or fall of the mean level or absolute level, or change in conductivity of the liquid of the stream.

Except for this connection for adding a compensating potential to the grid 34, the rest of the system in Figure 2 is identical with that shown in Figure 1. The transformers 19, 27, 77 and 79 are of substantially the same winding ratios, and have substantially the same characteristics. The net result is that if the level of the stream 6 should drop, the liquid arm of the bridge 57 increases and unbalances the bridge to produce a potential additive to the potential of the bridge circuit of the main Wheatstone bridge which includes the electrodes 8 and 9. This means that if the difference in level upon the opposite sides of the screen 5 indicates a certain clogging of the screen 5, the same will be indicated and recorded on the recorder 53, and when the critical difference is reached, the alarm A and control element C will be activated by de-energization of the relay winding 39, regardless of the absolute level involved, and regardless of change in conductivity of the liquid of the stream.

Now it will be apparent that the voltage appearing across the bridge circuit of the bridge 57 is controlled by and may be caused to indicate the absolute level of liquid in the stream 6, and that the elements which add the corrective factor in Figure 2 might themselves constitute a liquid level indicator, recorder and level restorer. In Figure 3 we have shown the Wheatstone bridge 57, the one arm of which is responsive to liquid level, as connected to the triode 30 and the alarm circuit 48, where an indication or correction of absolute level only is desired. In Figure 3, the electrodes 55 and 56 which project into the stream or other body of water 6, provide the grounded arm of the Wheatstone bridge 57. One of the parallel paths through the bridge is through the fixed resistors 58 and 59, and the other parallel path is through the fixed resistor 60 and the variable resistance presented by the variable level of liquid and electrode 56. Power is supplied to these two paths by the secondary or low tension winding 72 of the step-down transformer 70, the primary of which is connected to the A. C. power supply mains 3. The bridge circuit which bridges the normally equi-potential points 64, 68, includes the conductors 75 and 65 connected to the secondary 76 of the step-up transformer 77. The high tension or secondary winding of the transformer 77 is connected through the adjustable resistor 79 and conductors 83 and 84 to the grid and cathode 34 and 36, respectively, of the triode 30, the plate circuit of which provides a regulable path for current flow through the winding 39 of the relay 38. This relay, as in the case of Figures 1 and 2, governs an alarm and control circuit 48. The variations of level, as detected by the Wheatstone bridge 57, may be indicated and recorded on the indicating recorder 53 connected across the secondary winding 78 of the transformer 77.

As above explained, the Wheatstone bridge and its electrodes, which are subject to variations in level or differences in level, are maintained at any suitable low voltage through the device of the step-down transformer, and yet the electron tube, which is the responsive element, is operated at the full voltage of the alternating current mains through the device of the step-up transformer. These transformers isolate electrically the bridge connections from the power connections both for power supply and for the control circuit.

We do not intend to be limited to the details shown and described, since those skilled in the art will adapt and modify the invention for their own purposes. We intend to cover all such adaptations and modifications as come within the limitations of the appended claims.

We claim:

1. Means responsive to differences in liquid level upon opposite sides of a screen in a water channel comprising a pair of electrodes extending downwardly into the liquid in the channel one on each side of the screen, a fixed resistance connecting the upper ends of said electrodes, means for impressing a difference of electrical potential upon said electrodes and upon the connected ends of said resistance, a bridge circuit connected at one end to said screen and at the other end to an intermediate point on said resistance whereby upon equal levels being maintained at said electrodes no difference in potential will appear at the ends of the bridge circuit, and an indicating means activated upon a difference of potential being impressed upon said bridge circuit.

2. A level controlled system of the class described comprising the combination of an alternating current power supply circuit, a normally energized relay having a winding, a triode electronic tube having anode and cathode connected in series with the relay winding to said power supply circuit, a pair of electrodes extending downwardly into a stream channel to make variable contact with liquid in said stream channel, a screen disposed in the stream channel between said electrodes, a fixed resistance connected to the upper ends of said electrodes, a supply transformer having a primary connected to said power supply circuit, and a secondary to said electrodes, a control transformer, a bridge circuit including the primary of said control transformer connected at one end to an intermediate point on said resistance and at the other end grounded upon said screen, a grid control circuit for said triode including the secondary of said control transformer, said relay being de-energized by potential upon the grid of the triode in response to difference in potential upon the ends of the bridge circuit, and a work circuit responsive to deenergization of said relay winding to indicate an abnormal condition of the screen.

3. In a device of the class described, an alternating power supply circuit, a relay having a winding and contacts adapted to be held open while the winding is energized, a triode electronic tube having its plate and cathode connected in series with said relay winding and said supply circuit, a pair of electrodes adapted to project down into the stream of liquid on opposite sides of a screen in the liquid, a fixed resistor connected between said electrodes, a bridge circuit connected at one end to the midpoint of said fixed resistor and at the other end to said screen, a step-up transformer having its low tension winding in series relation in said bridge circuit and having its high tension winding connected to the grid and cathode of said triode tube, a step-down transformer having its high tension winding connected to said supply circuit and its low tension winding connected to the ends of said fixed resistor.

ARLEIGH R. ERICKSON.
WALTER P. JOHNSON.

References Cited in the file of this patent

UNITED STATES PATENTS

| Number | Name | Date |
|---|---|---|
| 1,388,479 | Nickum | Aug. 23, 1921 |
| 2,202,197 | Ewertz | May 28, 1940 |
| 2,261,495 | Ewertz | Nov. 4, 1941 |
| 2,503,654 | Centofanti | Apr. 11, 1950 |

FOREIGN PATENTS

| Number | Country | Date |
|---|---|---|
| 242,648 | Switzerland | Oct. 16, 1946 |